United States Patent [19]

Huan

[11] Patent Number: 5,295,711
[45] Date of Patent: Mar. 22, 1994

[54] SAFETY DEVICE FOR PROTECTING THE HEAD OF A DRIVER

[76] Inventor: Seing-Fuw Huan, 58, Ma Yuan West St., Taichung, Taiwan

[21] Appl. No.: 944,182

[22] Filed: Sep. 11, 1992

[51] Int. Cl.⁵ ............................................ B60R 21/055
[52] U.S. Cl. ................................. 280/751; 244/118.6; 297/395; 297/464
[58] Field of Search ................... 280/748, 751, 727; 180/271; 297/395, 464; 244/122 AG, 118.6

[56] References Cited

U.S. PATENT DOCUMENTS

| | | | |
|---|---|---|---|
| 2,833,554 | 5/1958 | Ricordi | 280/751 |
| 3,188,112 | 6/1965 | Oelkrug | 280/751 |
| 4,249,754 | 2/1981 | Best | 280/751 |

Primary Examiner—David M. Mitchell
Assistant Examiner—Andrew C. Pike

[57] ABSTRACT

A safety device for protecting a head of a user including two rods fixed on top of the vehicle, two slides slidably engaged on each of the rods, a cap coupled to the slides for engagement on the head of the user, and springs engaged on the rods and biased and engaged with the slides in order to absorb shocks transmitted to the head of the user.

13 Claims, 5 Drawing Sheets

SAFETY DEVICE FOR PROTECTING THE HEAD OF A DRIVER

BACKGROUND OF THE INVENTION (a) Field of the Invention

The present invention relates to a safety device for a vehicle, and more particularly to a safety device for protecting the head of the driver.

(b) Description of the Prior Art

A typical safety device for automobiles is shown in FIG. 5 and includes an air bag 90 formed above the steering wheel 92 when the automobile strikes on something or car accident happens. However, the air bag can be used one time only, if the air bag is filled with air inadvertently, the user can not restore the air bag by himself, it may cost a lot of money to restore the air bag.

The present invention has arisen to mitigate and/or obviate the afore-described disadvantage of the conventional safety devices for vehicles.

SUMMARY OF THE INVENTION

The primary objective of the present invention is to provide a novel safety device for protecting the head portion of the user.

In accordance with one aspect of the present invention, there is provided a safety device of a vehicle for protecting a head of a user comprising at least one rod fixed on top of the vehicle, a slide slidably engaged on the rod, a cap coupled to the slide for engagement on the head of the user, and means for biasing the slide in order to absorb shocks transmitted to the head of the user.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
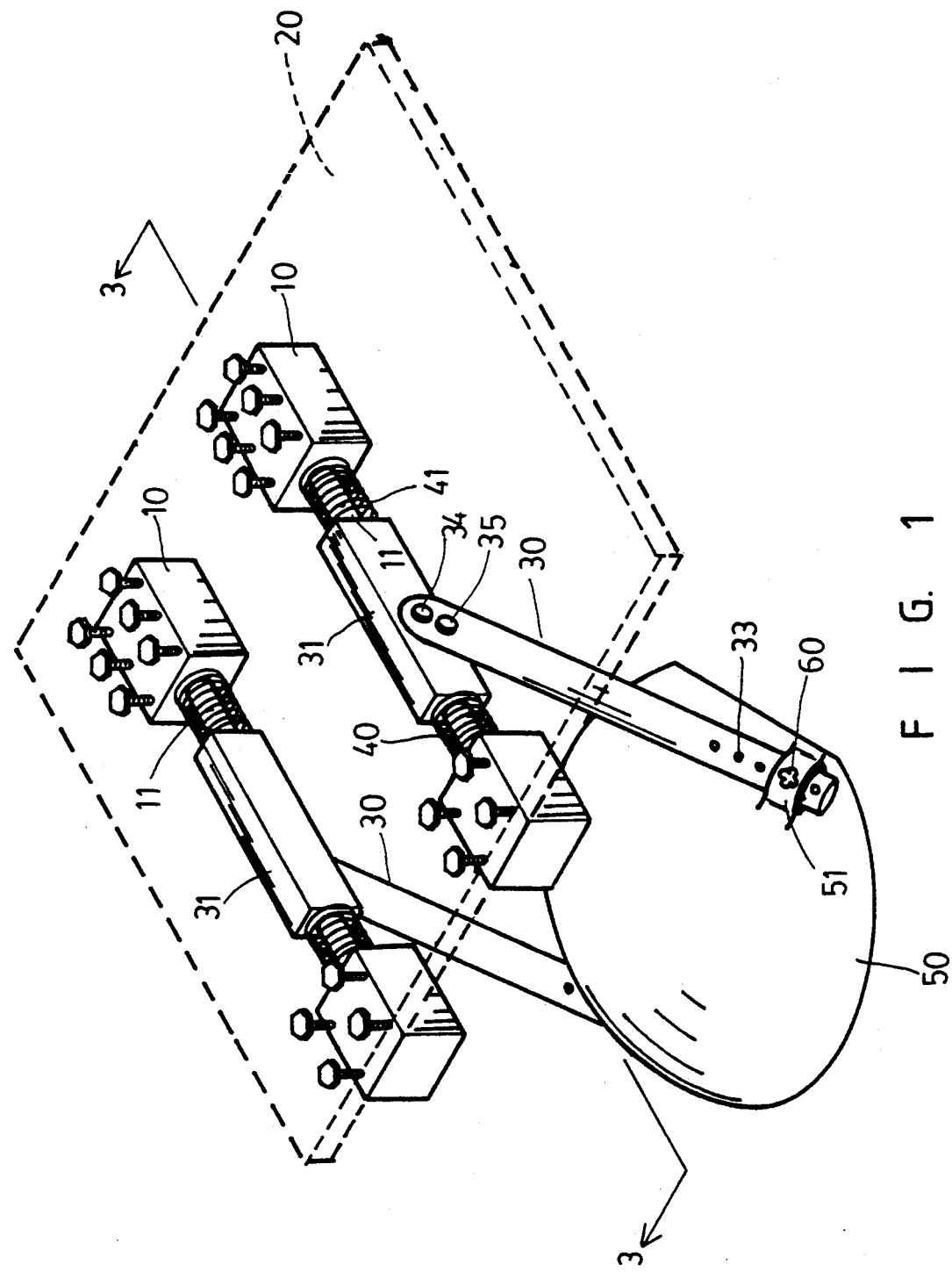
FIG. 1 is a perspective view of a safety device in accordance with the present invention.
Figure 2:
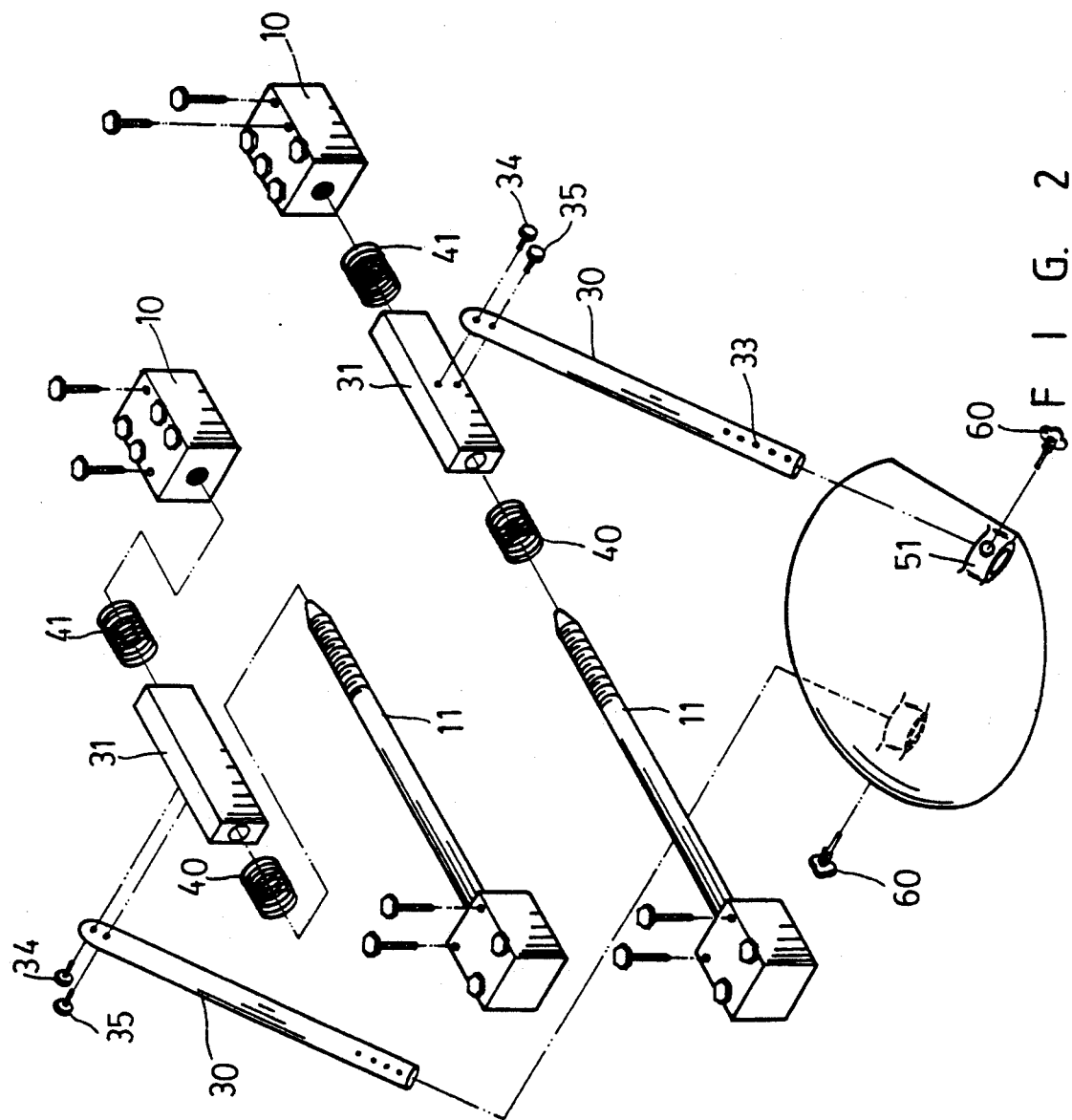
FIG. 2 is an exploded view of the safety device.
Figure 3:
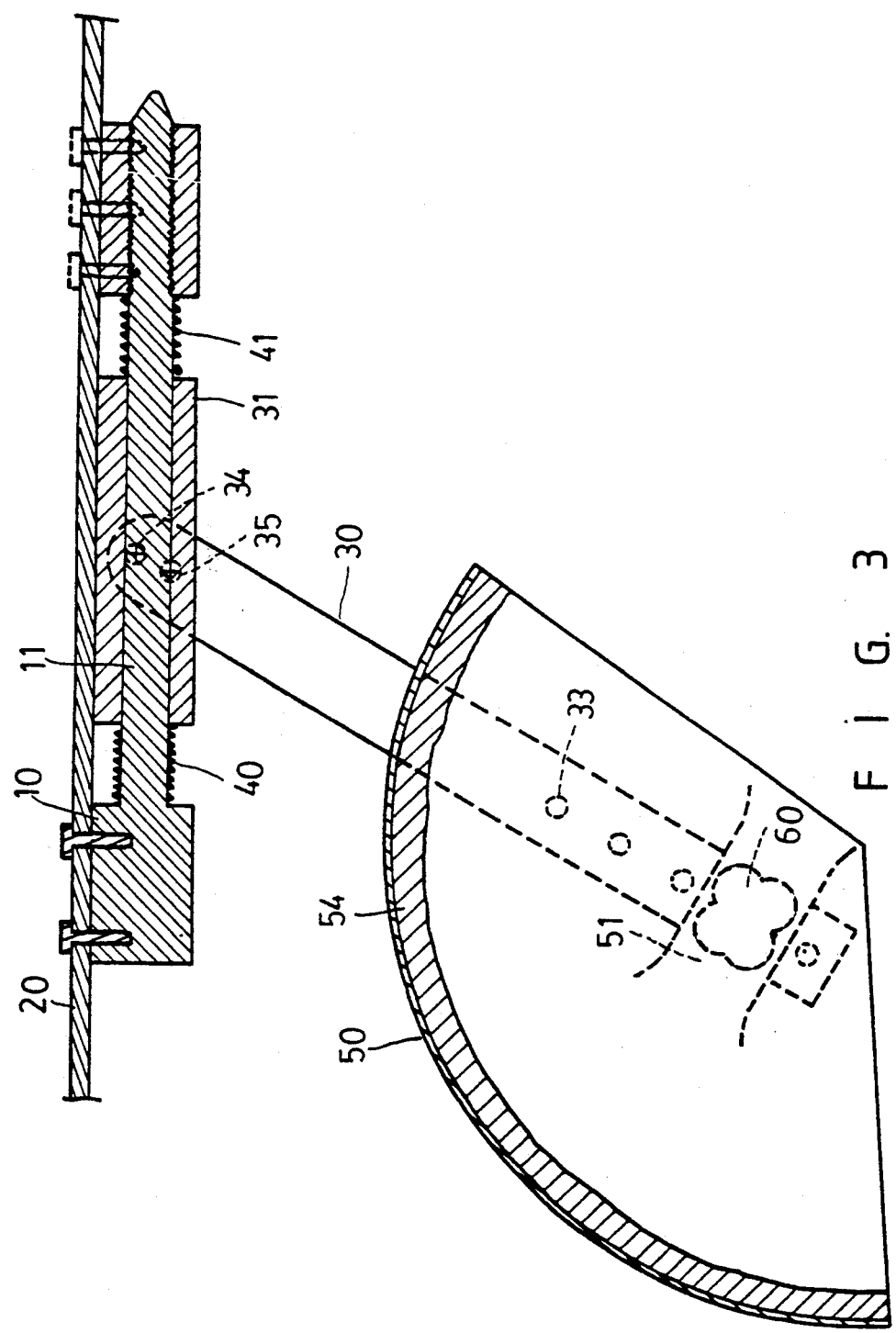
FIG. 3 is a cross sectional view taken along lines 3—3 of FIG. 1.

Referring to the drawings and initially to FIGS. 1, 2 and 3, a safety device in accordance with the present invention is provided for protecting the head portion of the users, particularly the driver of the vehicle and comprises generally two pairs of blocks 10 fixed on top of the vehicle 20, a rod 11 fixed between each pair of the blocks 10 and extended along the longitudinal direction of the vehicle, a slide 31 slidably engaged on each of the rods 11, two springs 40, 41 engaged on each of the rods 11 and biased between the slide 31 and the blocks 10 for resiliently holding the slide 31 on the middle portion of the respective rod 11, a post 30 including a first end fixed to each of the slides 31 by two screws 34, 35 and including a plurality of holes 33 formed in the second end thereof, a cap 50 for engagement on the head of the driver including two ears 51 formed thereon for receiving the second ends of the posts 30, and a screw 60 engaged on each of the ears 51 and engaged with the holes 33 of the posts 30 in order to fix the cap 50 to the posts 30.

It is to be noted that the screws 60 can be engaged with either of the holes 33 of the respective posts 30, and the posts 30 and the cap 50 are rotatable about the respective screws 34 when the screws 35 are unthreaded, such that the cap 50 can be adjusted in order to fit the head of the driver. As best shown in FIG. 3, a layer of shock absorption material 54 is preferably applied to the inner peripheral portion of the cap 50 for absorbing shocks and vibrations transmitted to the head of the driver.

Figure 4:
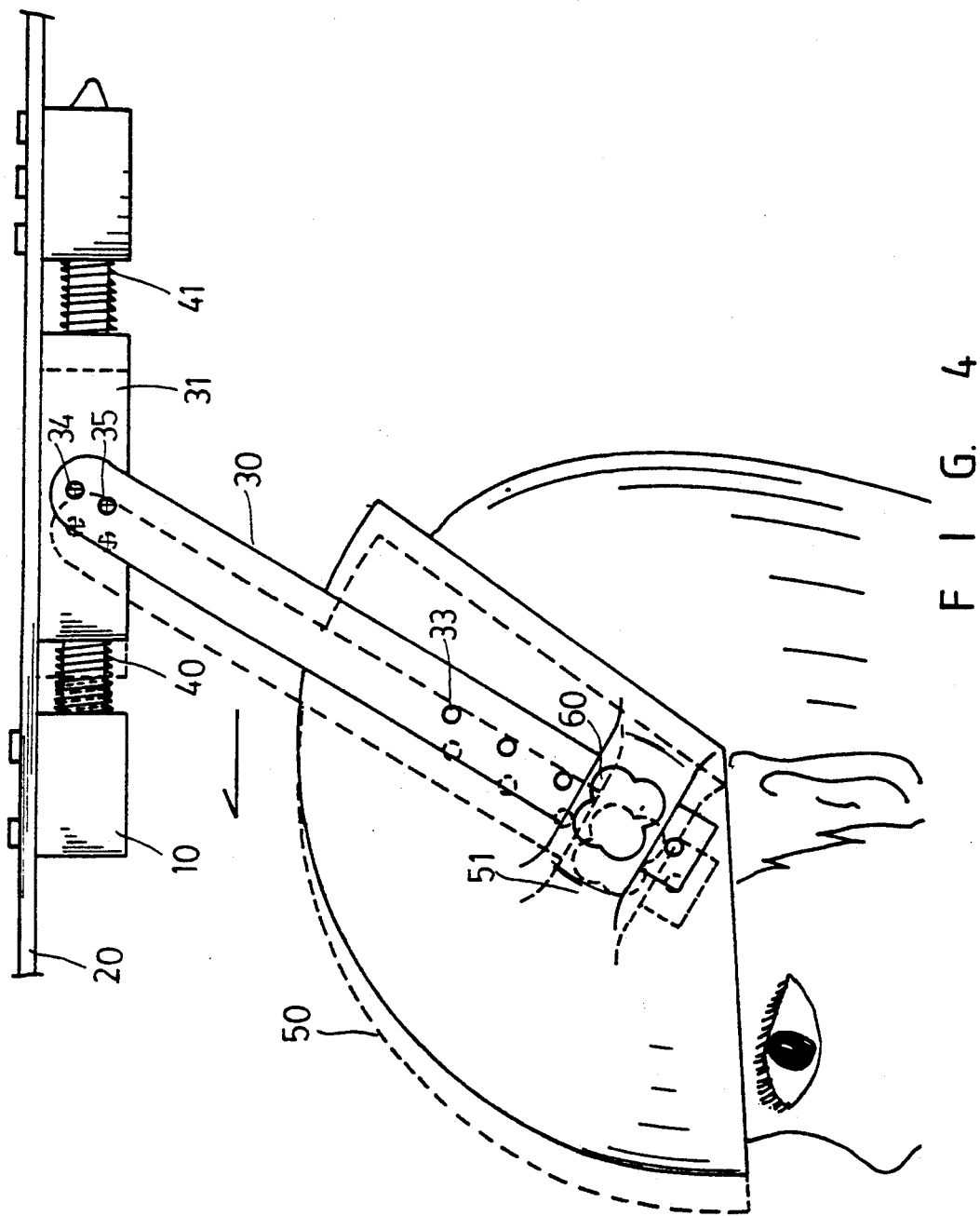
FIG. 4 is a schematic view illustrating the operations of the safety device.
Figure 5:
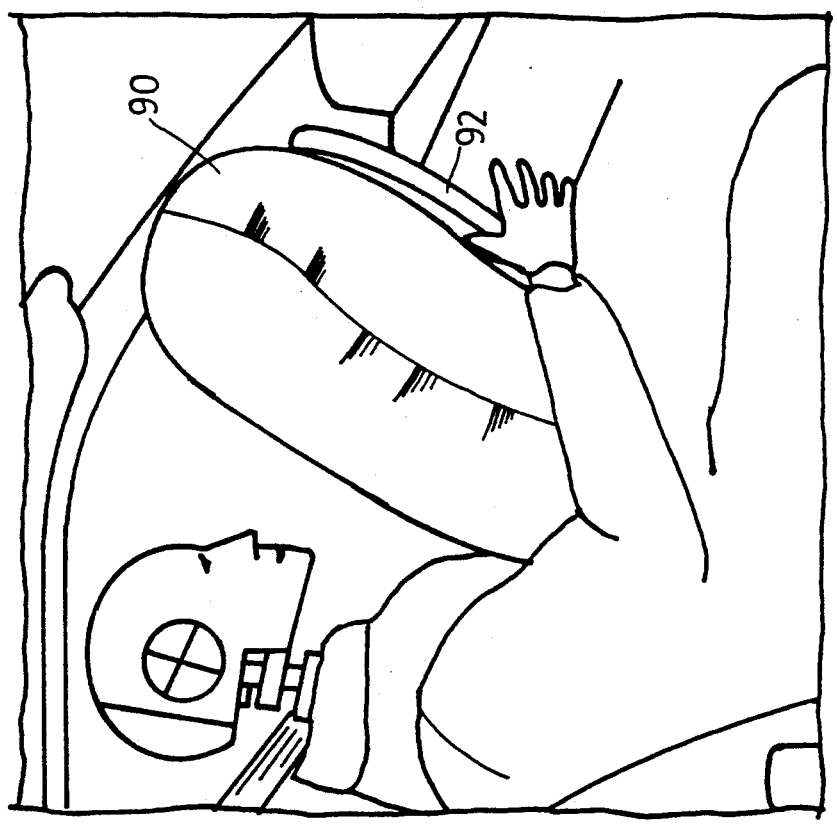
FIG. 5 is a schematic view illustrating the typical safety device for automobiles.

In operation, as shown in FIG. 4, the cap 50 and the slides 31 are caused to move forward by the head of the driver when the vehicle strikes on something or when car accident happens, the shocks can be absorbed by the springs 40, 41, particularly the springs 40, such that the head of the driver can be suitably protected.

Accordingly, the head of the user can be protected by the safety device in accordance with the present invention.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A safety device of a vehicle for protecting a head of a user comprising at least one rod fixed on top of said vehicle, a slide slidably engaged on said rod, a cap coupled to said slide for engagement on said head of said user, and means for biasing said slide in order to absorb shocks transmitted to said head of said user, two blocks fixed to said top of said vehicle, said rod being fixed between said blocks, and said biasing means including a pair of springs engaged on said rod and biased between each of said blocks and said slide for biasing said slide.

2. A safety device according to claim 1, wherein said cap includes at least one ear formed therein, a post includes a first end fixed to said slide and includes a second end slidably engaged in said ear of said cap and having at least one hole formed therein, and a bolt engaged in said ear and engaged with said hole in order to fix said cap to said post.

3. A safety device according to claim 2, wherein said first end of said post is fixed to said slide by two screws, and said post is rotatable about a first screw of said two screws when a second screw of said two screws is unthreaded and is fixed in place when said second screw is threaded in place.

4. A safety device according to claim 1, wherein said cap includes a layer of shock absorption material applied to an inner peripheral portion for further absorbing shocks transmitted to said head of said user.

5. A safety device of a vehicle for protecting a head of a user comprising two rods fixed on top of said vehicle, a slide slidably engaged on each of said rods, a cap coupled to said slides for engagement on said head of said user, and means for biasing each of said slides in order to absorb shocks transmitted to said head of said user.

6. A safety device according to claim 5 further comprising two pairs of blocks fixed to said top of said vehicle, each of said rods being fixed between a respective pair of said blocks, and said biasing means including a pair of springs engaged on each of said rods and biased between said blocks and the respective slides for biasing said slides.

7. A safety device according to claim 5, wherein said cap includes two ear formed therein, a pair of posts each includes a first end fixed to the respective slides and includes a second end slidably engaged in a respective ear of said cap and having at least one hole formed therein, and a bolt engaged in each of said ears and engaged with said hole in order to fix said cap to said post.

8. A safety device according to claim 7, wherein said first end of each of said posts is fixed to the respective slide by two screws, and said posts are rotatable about a first screw of said two screws when a second screw of said two screws is unthreaded and are fixed in place when said second screw is threaded in place.

9. A safety device according to claim 5, wherein said cap includes a layer of shock absorption material applied to an inner peripheral portion for further absorbing shocks transmitted to said head of said user.

10. A safety device of a vehicle for protecting a head of a user comprising two pairs of blocks fixed on top of said vehicle, a rod fixed between each pair of said blocks, a slide slidably engaged on each of said rods, a spring biased between each of said blocks and said slide, a cap coupled to said slides for engagement on said head of said user, whereby, said springs may absorb shocks transmitted to said head of said user.

11. A safety device according to claim 10, wherein said cap includes two ear formed therein, a pair of posts each includes a first end fixed to the respective slides and includes a second end slidably engaged in a respective ear of said cap and having at least one hole formed therein, and a bolt engaged in each of said ears and engaged with said hole in order to fix said cap to said post.

12. A safety device according to claim 11, wherein said first end of each of said posts is fixed to the respective slide by two screws, and said posts are rotatable about a first screw of said two screws when a second screw of said two screws is unthreaded and are fixed in place when said second screw is threaded in place.

13. A safety device according to claim 10, wherein said cap includes a layer of shock absorption material applied to an inner peripheral portion for further absorbing shocks transmitted to said head of said user.

* * * * *